United States Patent [19]

Grulke, Jr.

[11] Patent Number: 4,833,609

[45] Date of Patent: May 23, 1989

[54] ERC WITH OPERATOR PROMPTING FOR ENTERING QUANTITY OF SELECTED MULTI-ITEM PACKAGED GOODS

[75] Inventor: James M. Grulke, Jr., Lawrenceville, Ga.

[73] Assignee: NCR Corporation, Dayton, Ohio

[21] Appl. No.: 63,601

[22] Filed: Jun. 18, 1987

[51] Int. Cl.⁴ .................. G06F 15/21; G07G 1/12
[52] U.S. Cl. .................................................. 364/405
[58] Field of Search ............... 364/405, 900; 235/383, 235/375

[56] References Cited

U.S. PATENT DOCUMENTS

| | | | |
|---|---|---|---|
| 3,059,112 | 10/1962 | Rogal | 250/372 |
| 3,681,571 | 8/1972 | Strohschneider | 235/383 |
| 4,084,742 | 4/1978 | Silverman | 235/383 |
| 4,293,911 | 10/1981 | Oonishi | 364/405 |
| 4,365,148 | 12/1982 | Whitney | 235/383 |
| 4,419,573 | 12/1983 | von Geldern | 235/383 |
| 4,502,119 | 2/1985 | Tsuzuki | 364/405 |
| 4,521,677 | 6/1985 | Sarwin | 235/385 |
| 4,734,858 | 3/1988 | Schlafly | 364/408 |

FOREIGN PATENT DOCUMENTS

| | | |
|---|---|---|
| 0189830 | 8/1986 | European Pat. Off. . |
| 0152836 | 12/1979 | Japan . |
| 0003168 | 1/1982 | Japan . |
| 0180363 | 8/1986 | Japan . |
| 2141857 | 1/1985 | United Kingdom . |

*Primary Examiner*—Clark A. Jablon
*Attorney, Agent, or Firm*—Wilbert Hawk, Jr.; Albert L. Sessler, Jr.; Richard W. Lavin

[57] ABSTRACT

For a merchandise checkout system including an electronic cash register having a keyboard and a display, and which further includes a price look-up table in which is stored a plurality of records each including a first item number identifying the purchased merchandise item and a second item number identifying the merchandise item as one which is sold as part of a multi-item package in which the records are distinguished by the number of such merchandise items being purchased there is disclosed a method for processing the purchase of a multi-item merchandise item consisting of identifying the purchased item as one which is sold as part of a multi-item package, requesting that the operator insert the number of such merchandise items being purchased into the keyboard, combining the number inserted to the first item number associated with the purchased merchandise item to generate a second item number and looking up the price of the number of such merchandise items being purchased in the look-up table by comparing the second item number with the combined first and second item numbers in each of the second records.

1 Claim, 4 Drawing Sheets

FIG. 2

| | SIZE | ITEM NUMBER | FLAG | PRICE | DATA |
|---|---|---|---|---|---|
| 92 | 00 | 1234567890 | 1 | | |
| | | | | | |
| 94 | 1 | 1234567890 | | .50 | |
| | | | | | |
| | 6 | 1234567890 | | 2.79 | |
| | | | | | |
| | 12 | 1234567890 | | 5.28 | |
| | | | | | |
| | | | | | |
| | | | | | |
| | | | | | |
| | | | | | |

ERC WITH OPERATOR PROMPTING FOR ENTERING QUANTITY OF SELECTED MULTI-ITEM PACKAGED GOODS

BACKGROUND OF THE INVENTION

The present invention relates to an electronic cash register which processes data pertaining to a merchandise item purchased as part of a checkout operation and more particularly to a system for identifying one of a plurality of different price levels for a purchased merchandise item which is normally sold as part of a multiple-item package.

Merchanidise items such as soda and beer are normally sold in packages of 6, 8 or 12 bottles. As part of a merchandise checkout operation, a UPC label is attached to the package containing data identifying the merchandise item but not the number of units contained in such package. During the checkout operation of the package, the UPC label is read by an optical reader and the data obtained is used to access a price look-up table in a RAM memory or in a remotely located disc file to obtain the price of the merchandise item which is then displayed in the display of the electronic cash register associated with the checkout system. In order to identify the number of bottles in the package sold when the number is less than the original number of bottles in the package, such as a six-pack, a qualifier key on the keyboard is used as part of a keyboard operation to identify the number of bottles in the package sold. The use of this type of key adds an additional binary digit to the UPC item code thus giving the package size a unique number which can be used to abstract the correct price for the number of bottles sold. The problem with this type of arrangement is that the operator must recognize the need to use a qualifier key. The number of qualifier keys provided on the keyboard are limited to the most popular size packages that are sold by the store. It has been found that in convenience stores, which are open twenty-four hours a day, the number of such merchandise items sold is frequently less than six. This has required the clerk to look up the price for a single item and enter manually the price into the cash register when the item purchased is one. When the item purchased is greater than one but less than six, the operator is required to repeat the single item transaction for each item sold. It is therefore a principal object of this invention to provide a system for automatically accessing a memory for the price for a merchandise item which can be sold in varying numbers without requiring the use of a qualifier key on the keyboard. It is another object of this invention to provide a system for storing a large number of price levels for a single merchandise item.

SUMMARY OF THE INVENTION

These and other objects of the invention are fulfilled by storing in a memory an item number identifiying a purchased merchandise item together with a flag identifying the item as a packaged item which may be sold in various numbers. There is also stored in the memory a plurality of item numbers corresponding to the original item number with the addition of a size number attached to each of the item numbers. Listed in each of the records in the memory associated with the item number and its associated size number is the price of the merchandise item. During the checkout operation, the item number of the package is first determined by either scanning the UPC label on the package by an optical reader or by the manual insertion of the item number into the keyboard of a electronic cash register associated with the checkout operation. The item number is then used to access a price look-up file in which the item number of the purchased item is compared with the item numbers stored in the file. After a comparison has occurred, the flag is detected which controls the electronic cash register to actuate the display on the cash register indicating to the operator that the size or number of individual merchandise items that is being sold as part of the package should be entered into the keyboard. Upon the actuation of a transaction key on the keyboard, the data pertaining to the size or number of merchandise items being sold is then appended to the original merchandise item number to form an item number which is used to again access the price look-up file from which the actual price of the purchased merchandise items is obtained. This value is then transmitted to the electronic cash register for printing on a receipt and displaying the value informing the customer of the actual cost of the purchased merchandise items. As part of the receipt that is given to the customer, and also on the journal record that's printed as part of the merchandise checkout operation, the size or number of individual merchandise items that has been purchased is printed.

BRIEF DESCRIPTION OF THE DRAWINGS

Additional advantages and features of the present invention will become apparent and fully understood from the reading of the following description, taken in conjunction with the drawing, in which:

FIG. 2 is a plan view of the keyboard of the electronic cash register of FIG. 1;

DESCRIPTION OF THE PREFERRED EMBODIMENT

Figure 1:
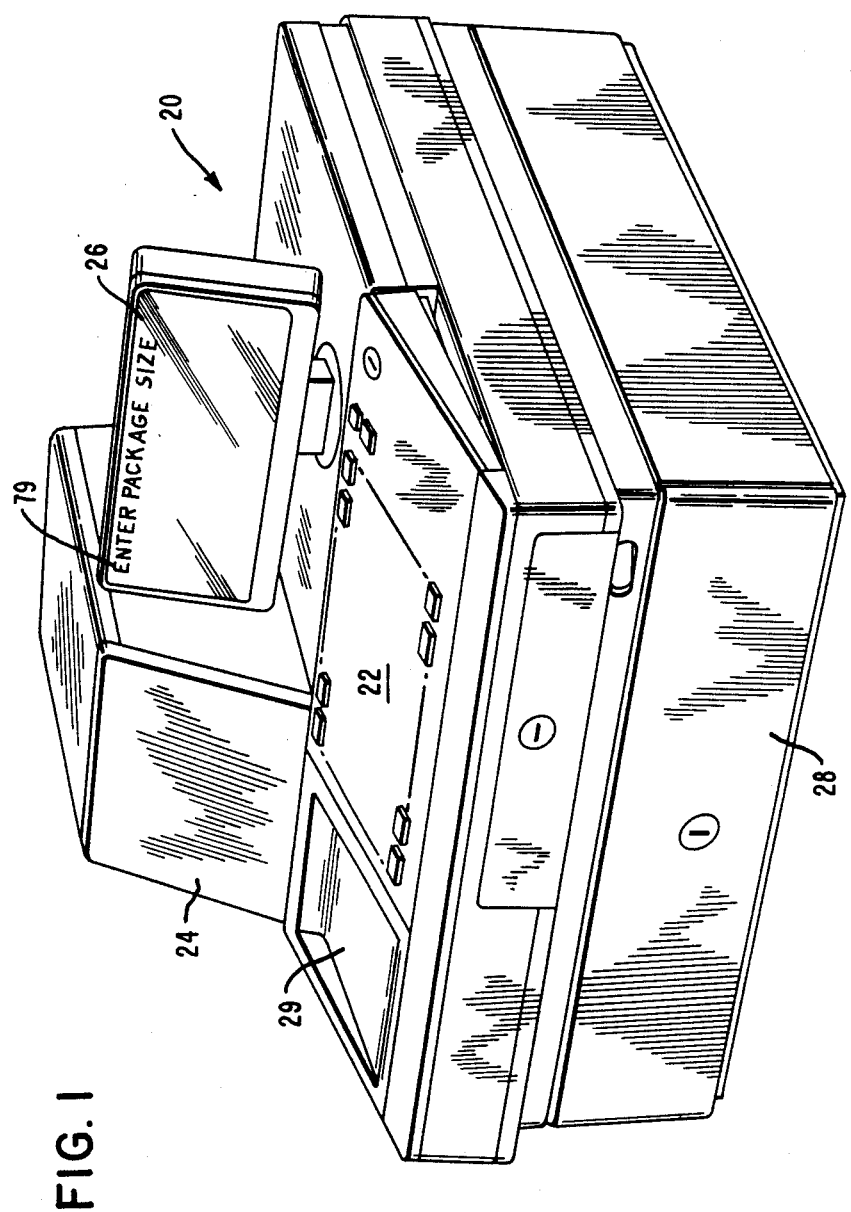
FIG. 1 is a perspective view of a electronic cash register used in the present checkout system.

Referring now to FIG. 1, there is shown a perspective view of the electronic cash register used in the present invention generally indicated by the numeral 20, which includes a keyboard 22, a display 26 extending from the top of the cash register, a printer 24 mounted on the left side of the keyboard and a cash drawer 28 which forms a support for the cash register. Positioned adjacent the keyboard 22 and the printer 26 is a slot 29 through which a receipt record member (not shown) moves to a position to be removed by the operator of the cash register for presentation to the customer at the conclusion of a merchandise checkout operation.

Figure 2:
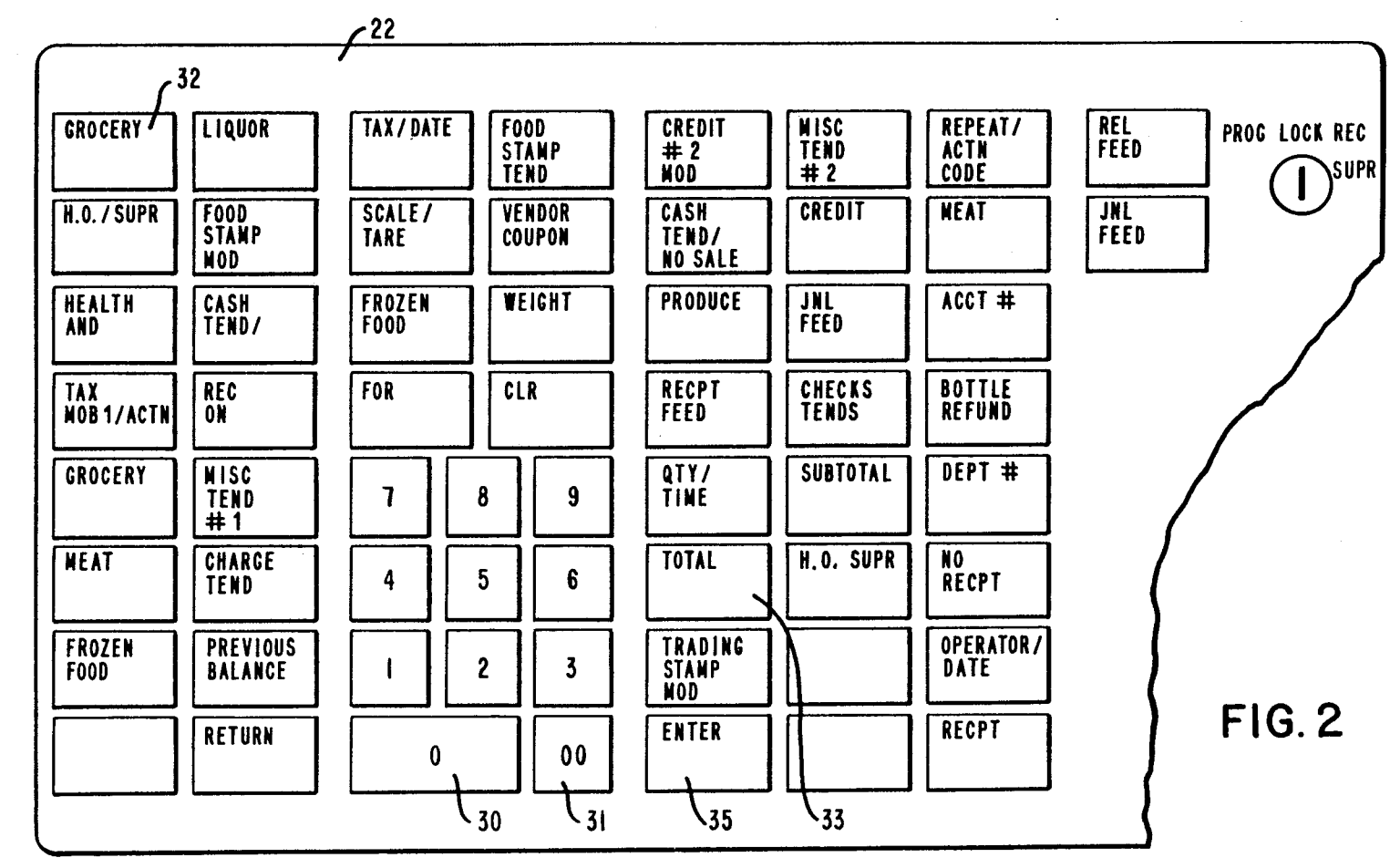

Referring now to FIG. 2, there is shown a plan view of the keyboard 22 which includes a 10-key portion 30 comprising a number of conventional keys on which is located indicia indicating the numbers 1-0. The 10-key keyboard further includes an additional key 31 on which is located a 00 indicia. The keyboard 22 further includes a number of rows of transaction keys 32 which are used to identify the department from which the purchased merchandise originates together with other control keys 33 which are used to totalize the checkout operation. Included in the control keys is an Enter key 35 used to control the access to a price look-up file as will be described more fully hereinafter.

Figures 3, 4:
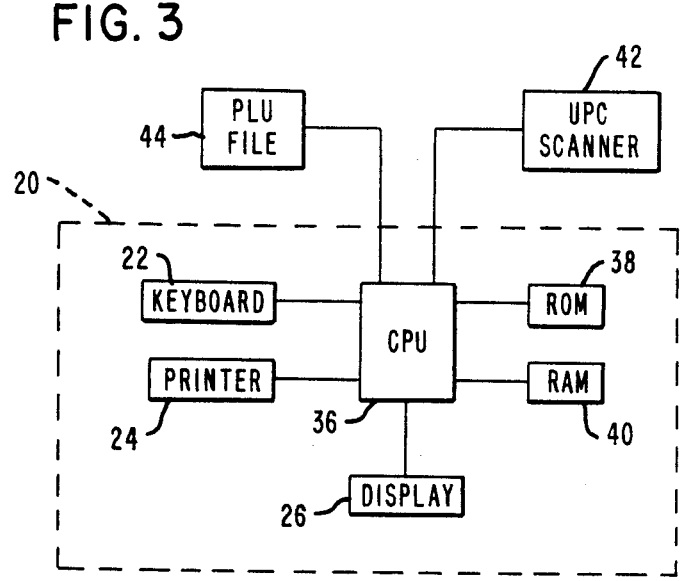
FIG. 3 is a schematic block diagram of the electronic cash register employed in the checkout system for processing a purchased merchandise item together with a remotely located optical scanner and price look-up file.
FIG. 4 is an illustration showing a portion of the price look-up file in which are stored the various records including a price level for a packaged merchandise item.

Referring now to FIG. 3 there is shown a block diagram of the electronic cash register 20 together with a remotely located price look-up file 44 and a UPC optical scanner 42 which interact with the cash register 20 to provide a checkout operation of purchased merchandise items. Included in the cash register 20 is a central processor unit (CPU) 36 which controls the printer 24 and the display 26. Associated with the CPU 36 is a ROM memory 38 in which is located the application software for operating the cash register 20 and a RAM memory unit 40 in which temporary totals are stored as part of the checkout operation. The price look-up file 44 has stored therein a price associated with each of the merchandise items found in the supermarket. When found as part of a look-up operation, the price of the merchandise item is transmitted to the CPU 36 for use in printing the price on a receipt member (not shown) by the printer 24 and displaying the price in the display 26 in a manner that is well known in the art. The UPC scanner 42 scans a UPC label located on the purchased merchandise item to generate data identifying the purchased merchandise item from which the price of the merchandise item is extracted from the PLU file 44 in a manner that is well known in the art. As will be described more fully hereinafter, the CPU 36 operates the display 26 in response to the program stored in the ROM memory unit 38 to control the type of data that is entered into the keyboard 22 by the operator.

Referring now to FIG. 4, there is shown a portion 50 of the price look-up file 44 (FIG. 3) showing the type of data that is stored in the file in accordance with the present invention. The first column 52 in the first record 92 in the file 44 includes binary data representing the size or number of merchandise items such as bottles of soda or beer which may be sold as part of a package merchandise item. In the next column 54, the item number associated with the package identifying the merchandise item normally sold in the package is stored. In the next column 56 identified as the flag column, a flag represented by the binary number one will be located to indicate that the item number associated with the purchased merchandise item is a multiple item package which may be sold at a size less than normal. The next and succeeding records in the file 44 include the same item number of the previous record, but differ in that the size or number purchased can be represented from any number from 1-99 and would include the price found in column 58 associated with such size. The last column 60 may contain any data necessary to the processing of the purchased merchandise item such as inventory control data.

Figure 5:
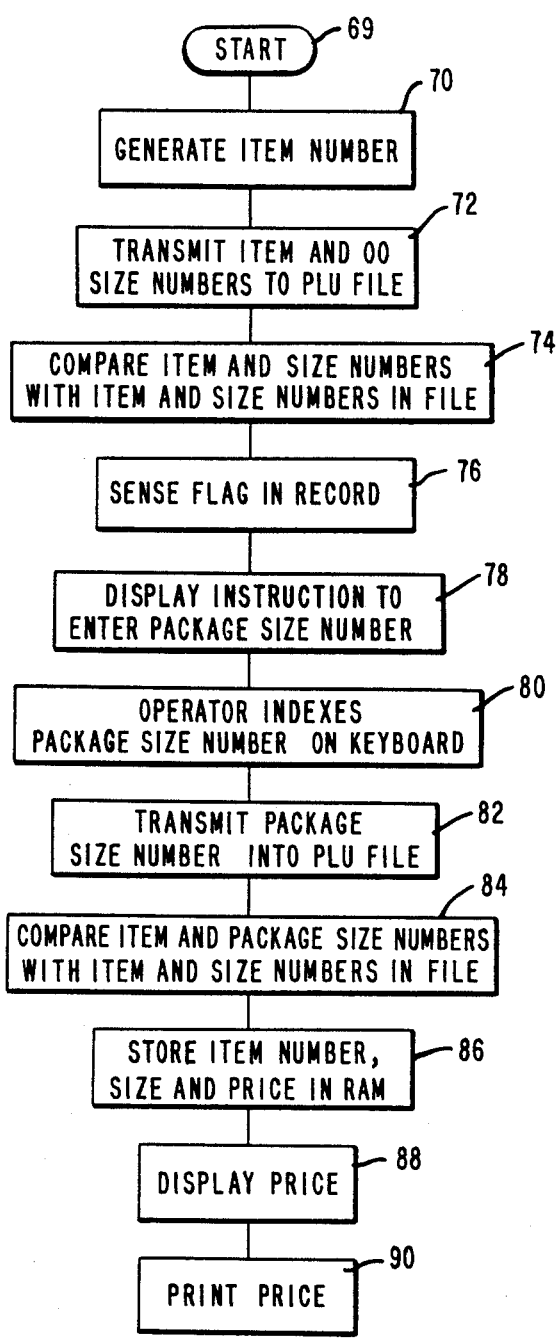
FIG. 5 is a flow chart showing one embodiment of the present invention.

Referring now to FIG. 5 there is shown a flow chart of the checkout operation of the present invention which starts at the beginning of the operation (block 69) by the operator moving the merchandise package past the optical scanner 42 (FIG. 3). The scanner 42 scans the UPC label on the package to generate binary data representing the item number (block 70) for transmission to the CPU 36. The CPU 36 in response to receiving the item number data from the scanner 42 will transmit the item number to the PLU file 44. This transmission of the data to the file 44 is controlled by the actuation of the key 31 (FIG. 2) which appends the size number 00 to the item number which is used to access the file 44. The item number together with the size number is then transmitted to the PLU file 44 (block 72). The item number is used to look up in the file portion 50 (FIG. 4) (block 74) the first record 92 in the file portion by comparing the combined size and item numbers with the numbers in columns 52 and 54 of the file portion 50 (FIG. 4). In reading the first record after finding a comparison, the CPU 56 will sense that a binary one is stored in the flag column 56 of the first record 92 (block 76). In response to sensing the flag, the CPU will enable the display 24 to display the logo 79 (FIG. 1) entitled "Enter Package Size" (block 78). In response to the displaying of the logo 79, the operator indexes the package size number on the keyboard 22 utilizing the keys in the 10-key section 30 (FIG. 2) together with the Enter key 35 (block 80). In response to the indexing of the size number in the keyboard 22 and the operation of key 35, the CPU will transmit the item number and the size number to the PLU file 44 (block 82) from where the next record 94 in the file portion 50 is sensed by comparing the item number and the size number (block 84) with the numbers in columns 52 and 54 in the file portion 50 (FIG. 4) when only one bottle is sold. The price of the purchased merchandise item based on the size number associated with the item number is then extracted from column 58 (FIG. 4) and stored, together with the item and size numbers, in the RAM 40 (FIG. 3) or any other type of memory by the CPU unit 36 (block 86) for use in displaying the price (block 88) and totalizing the total cost of the merchandise item purchased. In addition, the price is printed on the receipt record member and the journal record member by the printer 26 (FIG. 1) (block 90).

It will be seen that the use of a flag to designate that the merchandise item can consist of any number of multiple items as part of the purchased merchandise item and instructing the operator to enter the size of the merchandise item that is being purchased reduces operator errors since the operator does not have to remember to preselect a modifying key to control the checkout operation.

While the features of the invention have been illustrated and described, it should be readily apparent to those skilled in the art that many changes and modifications can be made in the method of the invention presented without departing from the spirit and scope of the invention. Accordingly, the present invention should be considered as encompassing all such changes and modifications of the invention that fall within the broad scope of the invention as defined by the appended claims.

I claim:

1. A method for processing a plurality of merchandise items normally sold as part of a multi-item package utilizing a scanner for reading first binary data bits on a label attached to the merchandise item identifiying the merchandise item but not identifying that it is a multi-item package, a remote memory having a limited capacity and an electronic cash register having a keyboard and a display comprising the steps of;

storing in the remote memory a first record comprising second binary data bits identifying a merchandise item and a third binary data bit identifying the associated merchandise item as one sold in a multi-item package;

storing in the remote memory a plurality of second records each comprising fourth binary data bits identifying the merchandise item and the number of such merchandise items being sold and fifth binary data bits representing the total price of the items sold;

scanning the label attached to the purchased merchandise item for generating said first binary data bits;

comparing the first binary data bits with the second binary data bits in the first record;

reading the third binary data bit upon finding a comparison between the first and second binary data bits;

displaying instructions in the display to generate sixth binary data bits identifying the number of merchandise items sold in response to the reading of said third binary data bit;

actuating the keyboard in response to the displaying of the instructions to generate said sixth binary data bits;

combining the sixth binary data bits with the first binary data bits;

comparing the combined first and sixth binary data bits with the fourth binary data bits in each of the second records; and displaying the fifth binary data bits as the price of the purchased merchandise items in the display in response to finding a comparison between the combined first and sixth binary data bits and the fourth binary data bits in one of the second records.

* * * * *